United States Patent [19]

Esposito et al.

[11] 4,125,944
[45] Nov. 21, 1978

[54] LEVEL FOR POWER HAND DRILL

[76] Inventors: Philip Esposito; George Spector, both of 3615 Woolworth Bldg., 233 Broadway, New York, N.Y. 10007

[21] Appl. No.: 713,097

[22] Filed: Aug. 10, 1976

[51] Int. Cl.² .............................................. G01C 9/28
[52] U.S. Cl. ........................................ 33/347; 33/334
[58] Field of Search ................. 33/334, 347, 382, 385, 33/386, 390

[56] References Cited

U.S. PATENT DOCUMENTS

| 456,086 | 7/1891 | Forwood | 33/390 |
| 2,767,483 | 10/1956 | Sauer | 33/390 X |
| 2,782,524 | 2/1957 | Vogt | 33/347 |
| 2,820,302 | 1/1958 | Mitchell | 33/382 X |
| 3,030,710 | 4/1962 | Fell | 33/390 |
| 3,835,547 | 9/1974 | Rishoud | 33/347 |
| 4,038,757 | 8/1977 | Hicks et al. | 33/247 |

Primary Examiner—Charles E. Phillips

[57] ABSTRACT

A small, pocket level that can be readily and easily attached to any portable power tool so that the tool is operated on an accurately horizontal and vertical axis; the level including a transparent glass containing a fluid and an air bubble space, the glass being of cross-shape, bowed slightly upwardly at its center so to obtain a level position along two directional axes at right angle to each other; the level being attachable to the tool by a permanent magnet base.

2 Claims, 10 Drawing Figures

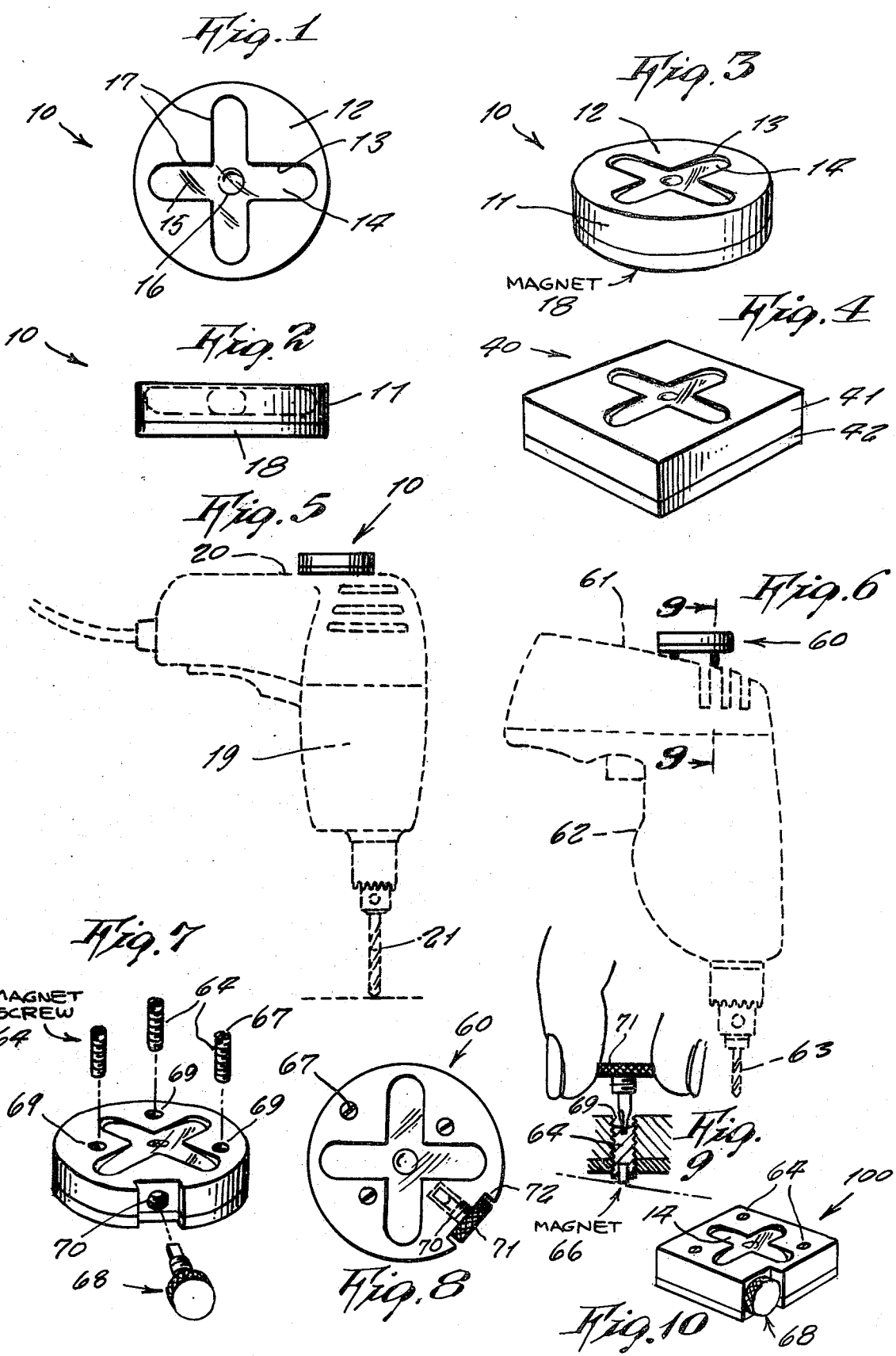

LEVEL FOR POWER HAND DRILL

This invention relates generally to levels of the type that are known as pocket levels because they are small and can be conveniently carried so to be handy for use.

It is generally well known that upon occassion it is necessary to drill a hole into an object in which the hole must be precisely vertical on all planes. While this can be accomplished easily by a drill press that is stationarily mounted level upon a floor, and the work is stationarily clamped upon the press, it cannot be done with a same accuracy if a portable power drill is employed and which is different to align or maintain in a level position. In view of the greater prevailance of portable power tools than large stationary machines, this situation is accordingly, in want of an improvement.

Therefore, it is a principal object of the present invention to provide a level that is quickly and easily attachable to portable power tools of any kind, so that they can be operated at a precision level.

Another object is to provide a level for power hand tools which includes a novel level glass that is designed to measure a level condition in two planes at right angle to each other.

Yet a further object is to provide a level which conveniently fits in a pocket so to be always handy and which can be otherwise used for leveling tables, appliances, billiard tables, and other equipment.

Other objects are to provide a level which is simple in design inexpensive to manufacture, rugged in construction, easy to use and efficient in operation.

These and other objects will be readily evident upon a study of the following specification and the accompanying drawing wherein:

FIG. 1 is a top view of the invention shown approximately a full size.

FIG. 2 is a side view thereof.

FIG. 3 is a perspective view thereof.

FIG. 4 shows a square model thereof in perspective.

FIG. 5 shows the device magnetically mounted upon a portable electric drill so to drill a vertical hole; it being understood that if a horizontal hole is to be drilled, the device would be mounted on the electric drill side surface which then would be horizontally on top.

FIG. 6 shows a modified design of the invention which is adaptable to mount on any electric drill wherein there is no surface that is perpendicular to the axis of the drill bit, such as a Black and Decker drill illustrated.

FIG. 7 shows the device of FIG. 6 having three adjustable screws therethrough so to adjust to any angle of supporting surface, thus aligning the plane of the device perpendicular to the drill axis; the screws being of permanent magnet material so the screw ends hold the supporting surface.

FIG. 8 is a top view thereof.

FIG. 9 shows a screw driver that can reach the screw heads deep inside the screw hole so to turn them; the screw driver being normally stored in a side edge of the device so to be always handy, and the screw shown being of a modified design in which only the screw tip has a permanent magnet.

FIG. 10 is a square shaped model of the device shown in FIG. 8.

Referring now to the drawing in greater detail, and more particularly to FIGS. 1 to 3 thereof at this time, the reference numeral 10 represents a level for power tools according to the present invention wherein the same includes a circular body 11 made of any suitable material and which on its upper side 12 has a cross-shaped depression 13 in which a cross-shaped, transparent, hollow glass 14 is secured, the glass having a liquid 15 and an air bubble 16 sealed therewithin. The four arms 17 of the cross-shaped glass, thus formed are downwardly slightly curved toward their outer ends so that when the bubble is at a center of the crossing arms, the level is in a horizontal plane in two directions at right angle to each other. A permanent magnet 18 is secured to an underside of the main body so that the level can be easily attached to a steel object such as the case of a portable electric drill 19 shown in FIG. 5.

In operative use, as shown in FIG. 5, it is evident when the level 10 is placed upon the drill face 20 which is at right angle to the axis of a drill 21, the drill can be drilled along a precisely vertical axis.

In FIG. 4, a modified design of the level 40 is the same as level 10 except that the main body 41 and the magnet 42 are square instead of round.

The level 10 is of a size that is approximately a same diameter as a one-half dollar coin and is ¼ inch thick. The level 40 is of an equivalent size thereto.

In FIGS. 6 through 9, another modified design of level 60 is shown which is adaptable for mounting upon any irregular, curved or inclined surface 61 of a portable tool such as an electric drill 62 which accordingly could not use the level 10. The level 60 however, is adjustable so that it is at right angle to an axis of the drill 63. This is accomplished by means of three set screws 64 engagable in threaded openings 65 of the level and which can protrude a variable amount from an underside of the level (as shown in FIG. 6) so that when the lower ends of the screws rest upon an inclined or other odd surface, the level 60 can be made perfectly horizontal.

The level 60 is made of a similar main body, glass and magnet as the level 10 described above, so that it can be mounted upon any horizontal steel surface without the necessity of using the screws. However, many portable tools today are made streamlined so that often all surfaces are curved or inclined. In such instances the level 60 is suitable. The lower end of each screw has a magnet 66 imbedded therein for adhering to the portable tool. The upper end of each screw has a screw-driven slot 67 engageable by a screw driven 68 so to rotate the screws when adjusting the level on the tool.

As shown, when not in use, the screws 64 are screwed down completely inside openings 69 of the level body so to not protrude therefrom. The screw driver 68 is screwed into a storage threaded opening 70 on an edge of the main body, the screwdriven head 71 fitting into notch 72. Thus the level 60 has no objectionable protrusions when not in use so it takes up a same space as level 10. The exposed knurlled head 71 of the screw driver can be reached by fingers so to turn and remove from the storage opening 70 in order to screw the magnet screws 64.

As shown in FIG. 10 a level 100 is the same as level 60 except that it is square instead of round.

Thus different designs of the invention are presented.

While various changes may be made in the detail construction, it is understood that such changes will be within the spirit and scope of the present invention as is defined by the appended claims.

What is claimed is:

1. In a pocket level, the combination of a main body, a depression upon an upper side, a transparent, hollow glass in said depression, a liquid and an air bubble sealed inside said glass, said depression and said glass each being of cross-shape having arms at right angle, said arms of said glass being slightly curved so that a center of said crossing arms is highest, and a permanent magnet secured to an underside of said main body wherein said main body and magnet have three, threaded openings therethrough vertically a screw in each said opening, and a magnet secured on the lower end of each said screw.

2. The combination of claim 1, in further combination with a short screwdriver having a threaded shank portion between a knurlled head adapted for manual actuation and an opposite end screw slot engaging blade, said screwdriver being engaged in a threaded opening in said main body.

* * * * *